(12) United States Patent
Martucci

(10) Patent No.: US 6,174,188 B1
(45) Date of Patent: Jan. 16, 2001

(54) IC CARD CONNECTOR

(75) Inventor: Roberto Martucci, Padova (IT)

(73) Assignee: Molex Incorporated, Lisle, IL (US)

( * ) Notice: Under 35 U.S.C. 154(b), the term of this patent shall be extended for 0 days.

(21) Appl. No.: 09/334,506

(22) Filed: Jun. 21, 1999

(30) Foreign Application Priority Data

Jul. 30, 1998 (EP) .................................................. 98114319

(51) Int. Cl.[7] .................................................. H01R 13/62
(52) U.S. Cl. ........................................... 439/326; 439/331
(58) Field of Search ..................................... 439/326, 325, 439/59, 73, 331, 629, 630, 488, 491

(56) References Cited

U.S. PATENT DOCUMENTS

| | | | |
|---|---|---|---|
| 5,226,826 | 7/1993 | Nillson et al. | 439/72 |
| 5,320,552 | 6/1994 | Reichardt et al. | 439/331 |
| 5,603,629 | 2/1997 | DeFrasne et al. | 439/331 |
| 5,813,878 | 9/1998 | Kuwata et al. | 439/326 |

*Primary Examiner*—Khiem Nguyen
(74) *Attorney, Agent, or Firm*—Stacey E. Caldwell

(57) ABSTRACT

An IC card connector (1) is provided for connecting an IC card (4) having a terminal array (5) to external equipment. The connector includes a base member (2) having a plurality of electrically conductive contacts (16, 17) exposed on one side of the base member (2) for engaging the terminal array of the IC card (4). A cover (3) is hinged to the base member for movement toward and away from the one side of the base member (2). The cover has a receptacle for securing the IC card (4) thereon for pivotal movement therewith and a sliding movement of the IC card (4) relative to the cover in a direction perpendicular to the axis of rotation. Pivoting of the cover (3) onto the base member (2) of the IC card (4) effects engagement of the IC card terminal array (5) with the plurality of contacts (16, 17) and a sliding movement of the IC card (4) relative to the cover (3) locks the IC card (4) and the cover (3) in the closed position of the connector (1).

17 Claims, 3 Drawing Sheets

IC CARD CONNECTOR

FIELD OF THE INVENTION

This invention generally relates to the art of electrical connectors and, particularly, to an IC card connector for connecting an IC card, especially a SIM card, in an IC card reader system in a cellular phone or the like.

BACKGROUND OF THE INVENTION

IC cards have been developed and contain IC's (integrated circuits) including memory circuits, such as rams (random access memories), and control circuits, such as CPUs (central processing units). A special type of IC card, called a SIM card (subscriber identification module card) is of increasing interest and used in cellular phones as an identification and storage unit for subscriber related data. SIM cards normally include a terminal array for connection through a card reader system to the external equipment. The connector usually includes some form of IC card socket and a plurality of electrodes or contacts exposed in the socket for engaging the terminal array of the IC card. The card is inserted and removed from the socket, and the connector contacts are resilient or comprise springy contacts for yieldably engaging the terminal array of the card when the card is inserted into the socket.

With the ever-increasing miniaturization of IC cards and their respective connectors, various problems continue to arise. For instance, the very handling of the miniature IC cards is difficult, and proper positioning of the cards in the connector presents corresponding problems when the card is inserted into and removed from the card-receiving cavity or other receptacle means of the connector. In addition, the terminal array on the card can become contaminated or soiled which can result in incomplete connections between the terminal array on the card and the contacts of the connector which, in turn, results in incomplete or intermittent connections to the external equipment. U.S. Pat. No. 5,320,552 teaches a contacting apparatus for an integrated IC chip card having a rotatable cover accommodating a chip card. The cover is movable relative to the chip card which is accommodated in the cover. It is intended to prevent any relative movement between the chip card and the contact elements of a base member when the cover is moved to the locking position. However, any contamination on the contacts of the base member or the chip card, e.g. as occurring during normal use from dirt, contaminants, oxidation or due to touching the contacts by the user, may cause a deterioration of the electrical properties of the contacts.

From EP 0 515 897 a chip card connector is known comprising means for locating the chip card in the inserted position and further locking means for holding the chip card in a locked reading position oriented parallel to a base member carrying contact elements for contacting the chip card. The connector is relatively simple to manufacture as there is no cover and generally only one base element securing the contact elements and accommodating the inserted chip card, but, as the locking means extend along the forward edge of the inserted chip card, it is difficult to grip and remove the inserted chip card from the connector. This invention is directed to solving the above problems in a miniature SIM card connector which is providing a reliable contact between IC card and connector and is simple to manufacture and assemble.

SUMMARY OF THE INVENTION

An object, therefore, of the invention is to provide a new and improved IC card connector for connecting an IC card having a terminal array, in an IC card reader system. In the exemplary embodiment of the invention, the IC card connector includes a base member having a plurality of electrically conductive contacts exposed on one side thereof. A cover is hinged to the base member for movement toward and away from the one side. The cover has receptacle means for securing the IC card thereon, whereby closing the cover onto the base member effects engagement of the IC card terminals with the contacts on the base member. According to the invention, said receptacle means hold the IC card for pivotal movement therewith and for sliding movement of the IC card relative to the cover in a direction perpendicular to the axis of rotation. A sliding movement of the IC card relative to the cover is apt to lock and unlock the IC card together with said cover in the closed position of the connector.

In the preferred embodiment of the invention, the IC card is moved relative to the contacts of the base member due to the sliding movement during opening and closing of the cover wiping away any contamination on the contacts. Thus a reliable and undisturbed contact is ensured over an extended time of use.

In a further preferred embodiment, the connector comprises locking elements formed at the base member and extends in the closed position of the connector over a portion of a forward edge of an inserted IC card, whereby the major part of the forward edge of the inserted IC card is not covered by the locking elements. Thus, a user easily may grip the remaining uncovered part of the forward edge of the IC card and force the IC card to an unlocked position.

The locking elements may be wedge-type providing a snap-in locking mechanism in cooperation with said forward edge of the IC card, which also permits closure of the connector. It only is necessary to close the cover with the inserted IC card until a click is heard or a tactile signal is encountered indicating the closed position of the connector.

In a preferred embodiment, the connector comprises means for applying an elastic force to the IC card generally in the direction of said sliding movement of the IC card and said means comprise an arm formed at the cover extending generally parallel to the axis of rotation.

The IC card connector further may include a friction device providing an increased mechanical tilt resistance in the closed position of the cover, so that the cover may be held in the closed position, even without an inserted and locked IC card. Advantageously, said friction device comprises a lateral projection formed at the base member and, in the closed position, engages a lateral flange portion of the cover.

The IC card connector may also include integrally formed snap-in hinge means for pivotally mounting said cover relative to said base member.

In a further preferred embodiment of the invention, the cover and the base member, respectively, are provided as a unitarily molded component of dielectric material such as plastic or the like. The cover has flanges providing means for slidably receiving the IC card in an edge-wise fashion.

The card reader system may include a printed circuit board and, in such an application, the base member is illustrated herein as including means, i.e. mounting pegs, for mounting the base member to the printed circuit board with the contacts engageable with circuit traces on the board. The contacts have resilient portions exposed on the one side of the base member for engaging the terminal array of the IC card.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
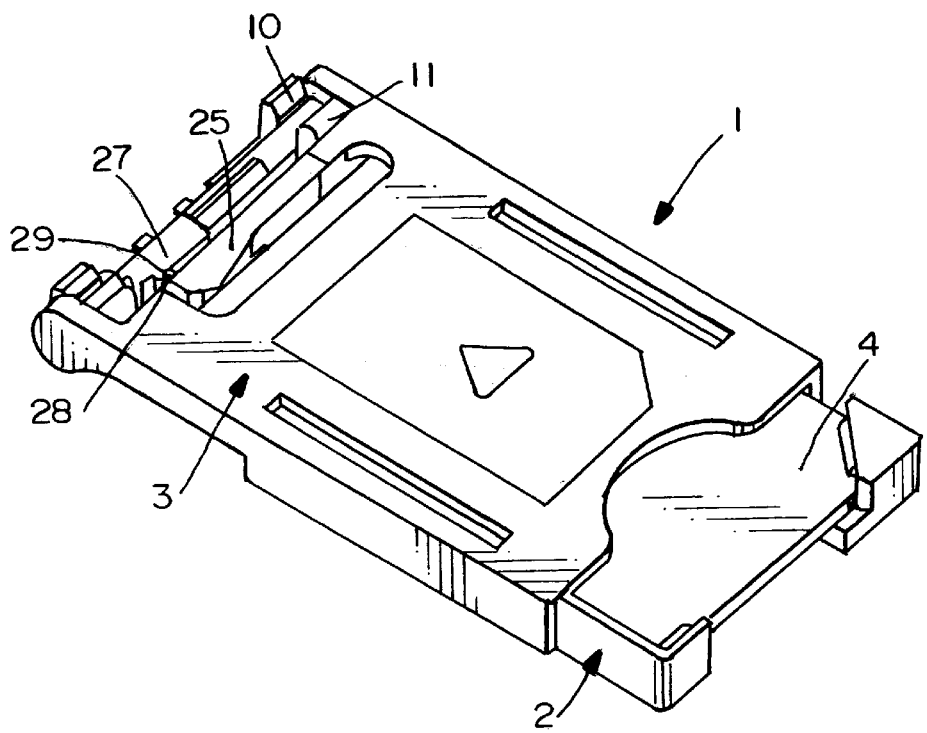
FIG. 1 is a perspective view of a closed IC card connector seen from above and embodying the concepts of the invention, illustrating an IC card being inserted into the cover of the connector.

Referring to the drawings in greater detail, and first to FIG. 1, the concepts of the invention are embodied in an IC card connector, generally designated 1, which is extremely simple and includes two basic components, namely a base member, generally designated 2, and a cover, generally designated 3. As described in greater detail hereinafter, FIG. 2 shows an IC card 4 inserted into cover in the direction of arrow "A".

Figure 3:
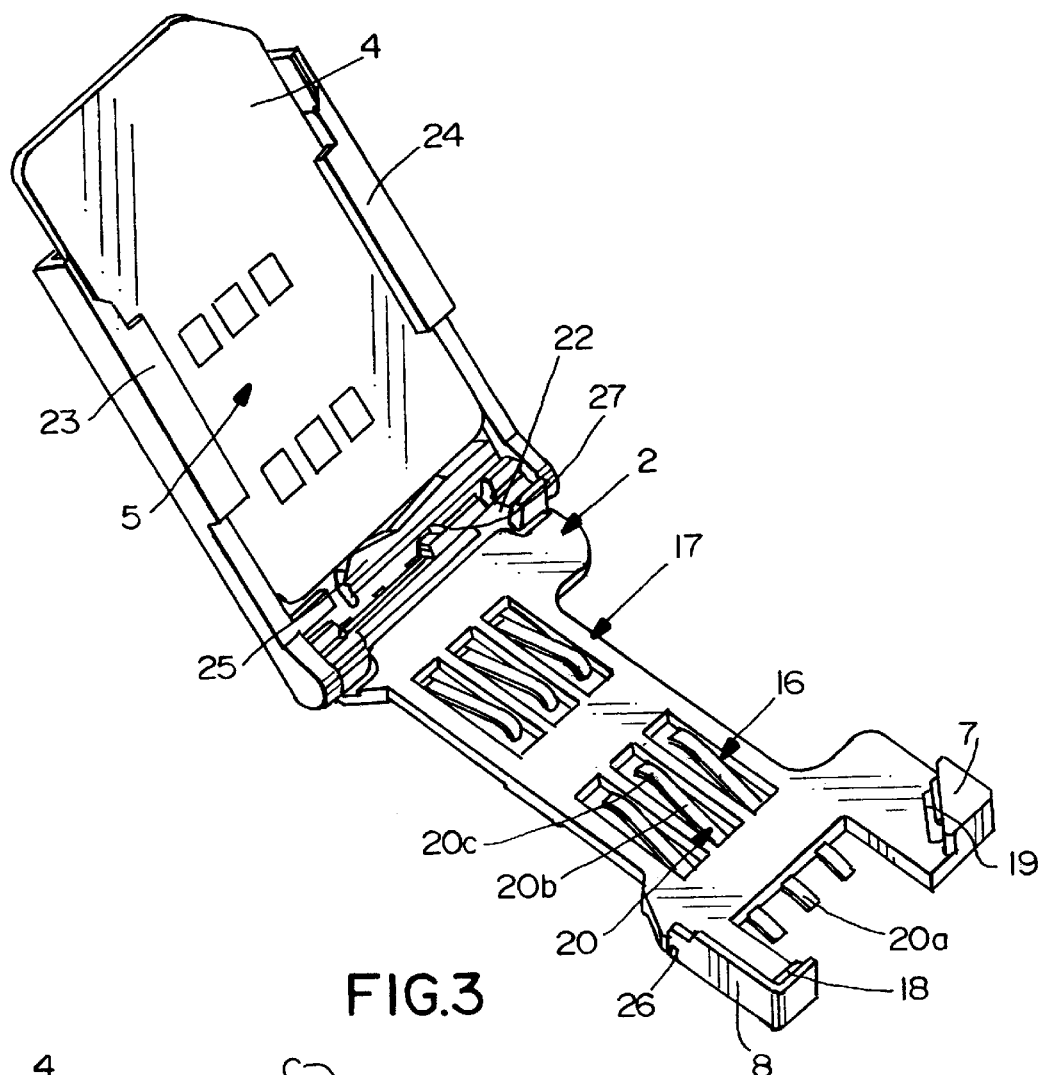
FIG. 3 is a perspective view of the opened IC card connector seen from above, illustrating an IC card being inserted edge-wise into the cover of the connector.

The IC card 4 is a miniature card of conventional or known construction and includes a terminal array 5 on the bottom side thereof (see FIG. 3). In a most preferred embodiment the IC card 4 is a SIM ("Subscriber Identification Module") card as used in cellular phones for identification and storage of subscriber related data.

Figure 2:
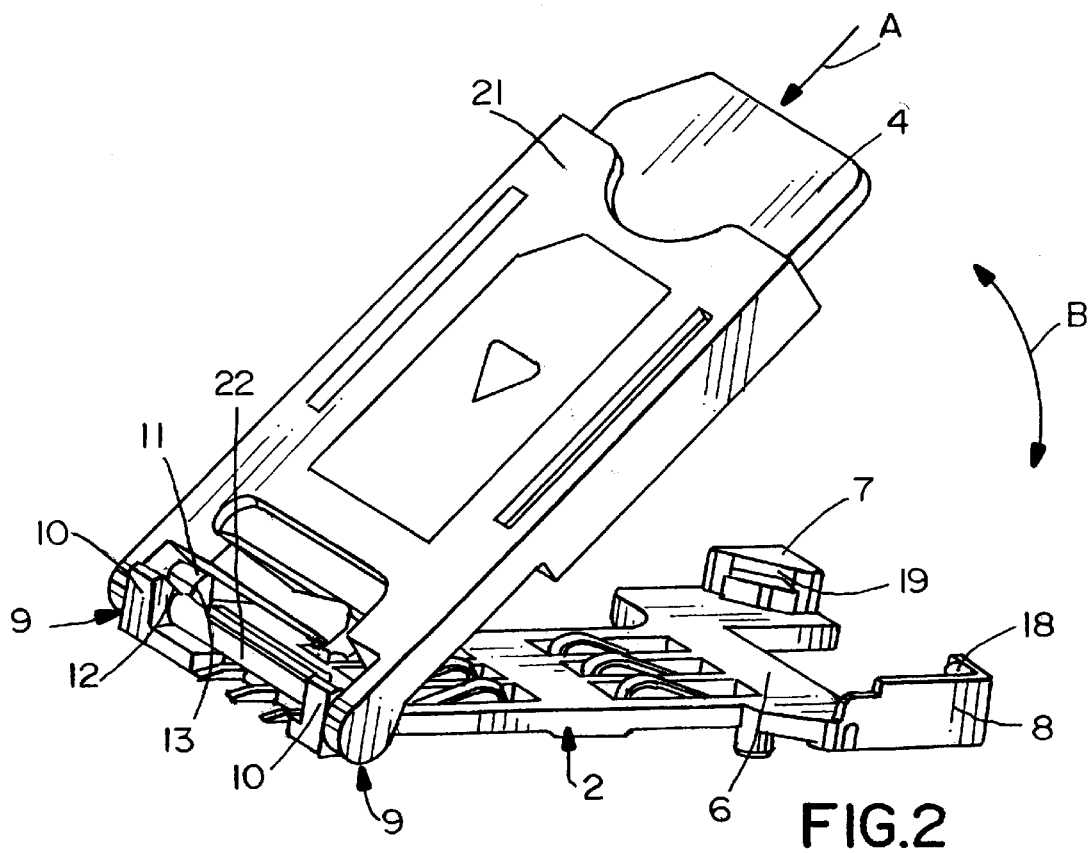
FIG. 2 is a perspective view of the opened IC card connector seen from behind, illustrating an IC card being inserted edge-wise into the cover of the connector.

Referring to FIG. 2 in conjunction with FIG. 3, base member 2 includes a generally flat base portion 6 having raised areas or wall and boss portions 7, 8 at the front end thereof. The rear part of base member 2 at the rear end of flat portion 6 supports hinge means 9 mounting cover 3 pivotally to base member 2. Hinge means 9 include two pairs of upwardly projecting portions 10, 11 and hook or snap-fit portions 12 at the end thereof are shown in FIGS. 2 and 3 in more detail.

Cover 2 is held pivotally in the direction of the axis of rotation (shown as double headed arrow "B" in FIG. 2) by hinge means 9.

Figure 4:
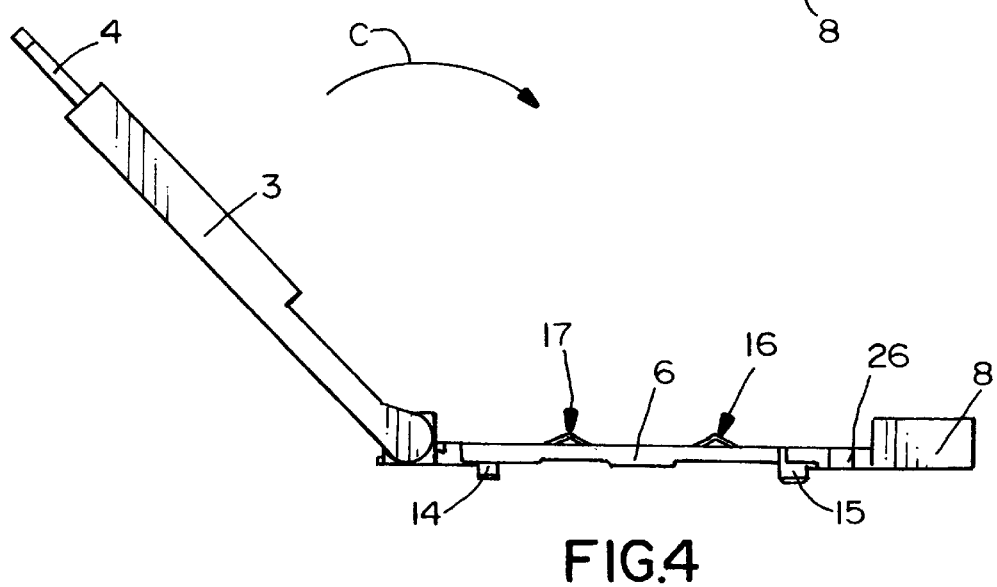
FIG. 4 is an elevational plan view seen from a side and showing the connector with an inserted IC card in a fully opened position.
Figure 6:
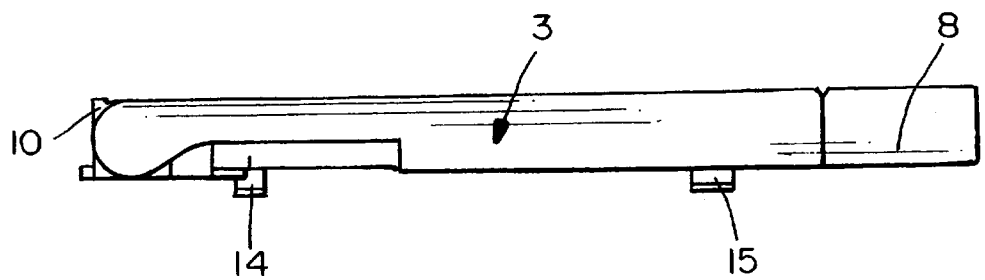
FIG. 6 is a side plan view showing the inventive connector in its closed position.
Figure 7:
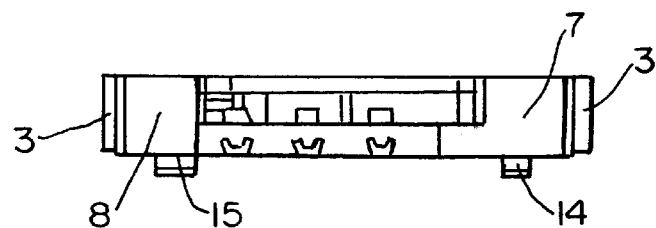
FIG. 7 is a plan view seen from the rear and showing the inventive connector in its closed position.

A plurality of mounting pegs 14, 15 depend from the underside of base portion 6 as shown best in FIGS. 4, 6 and 7 for mounting in appropriate mounting holes in a printed circuit board (not visible in the appended drawings), for instance. Each mounting peg 14, 15 may have a different diameter to ensure correct mounting on the printed circuit board. Lastly, a plurality of contacts, generally designated 16, 17 on base member 2, is mounted in base member 2 as will be described in greater detail hereinafter, whereby portions of the contacts are exposed on the top side of the base member 2 as can be seen in FIGS. 2, 3 and 4.

Referring to FIGS. 2 and 3, raised areas 7 and 8 include wedge-shaped projections 18, 19 which define respective locking means for portions of the forward-most edge of an inserted IC card 4. Projections 18, 19 are located at the forward edge of two sides of base member 2 and extend in the closed position of the connector 1 over two small portions of the forward edge of an inserted IC card 4. The middle portion of the forward edge of an inserted IC card 4 is not covered and can be gripped by a user.

Base member 2, therefore, includes all of the elements described above, including upwardly projecting portions 10, 11 having associated hook or snap-fit portions 12, 13 locking projections 18, 19 and mounting pegs 14, 15 and is fabricated of a unitarily molded single component of dielectric material, such as plastic or the like.

Referring to FIGS. 2 and 3 in conjunction with FIG. 4, FIG. 2 and 3 show perspective views of base member 2 and FIG. 4 shows a plan view of the side of base member 2. These figures best illustrate the configuration and mounting of the plurality of contacts 16, 17 on the base member 2. More particularly and described with reference to contact 20 shown in FIG. 3, each contact includes a generally horizontal leg held within base member 2 terminating at one end in an outside printed circuit board contact portion 20a. The contacts are formed with a resilient or springy leg 20b which is formed such that the resilient leg 20b projects upwardly beyond the top surface of the base member 2 so as to be exposed on the top side thereof and terminates in a card contact portion 20c.

Each contact of the plurality of contacts 16, 17 is held in the base member 2 by injection molding, e.g. insert molding, whereby the dielectric material of base member 2 encloses the horizontal leg of the respective contact. The base member 2 is shown in FIG. 3 as being of generally rectangular shape mounting contacts below the terminal array 5 of IC card 4. The outside ends 20a of the above-described contacts are adapted to contact the external circuitry of an underlying printed circuit board.

When the plurality of contacts 16, 17 is properly held within base member 2, and base member 2 is properly mounted to the printed circuit board, outside end 20a of each contact is maintained in surface contact with appropriate circuit traces on the surface of the printed circuit board.

Figure 5:
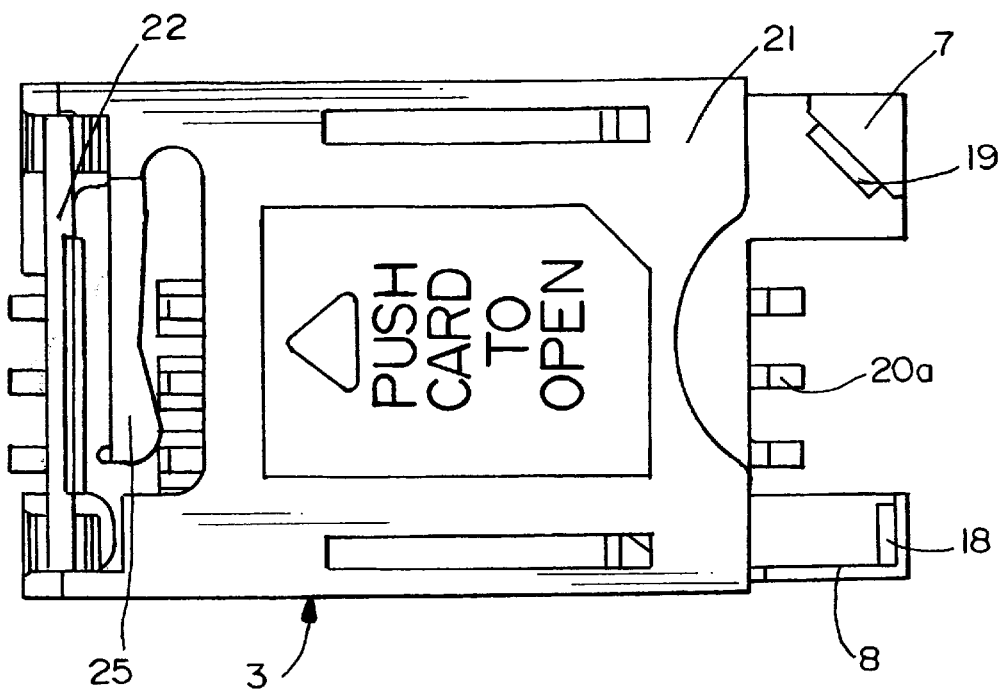
FIG. 5 is an elevational plan view from above showing a connector being closed without an inserted SIM card.

Referring to FIGS. 2 and 3 in conjunction with FIG. 5, cover 3 is a one-piece component fabricated of molded dielectric material, such as plastic or the like. The cover includes a thin, flat body 21 and a rear hinge pin 22 extending transversely of the body 21 and within upwardly projecting portions 10, 11 of base member 2. A pair of side flanges 23, 24 is formed to be spaced slightly from an inside surface of the body 21 and a flexible rear arm 25 is formed at the rear of cover 3. Flanges 23 and 24 project toward the middle of the body 21 to define receptacle means for an IC card 4 between the inside surface of body 21 and inside surfaces of flanges 23 and 24. The IC card 4 is inserted edge-wise prior to use in the direction of arrow "A" between side flanges 23 and 24 of the cover 3 in the opened position of connector 1 as shown in FIG. 3 until a leading edge of the IC card abuts the flexible rear arm 25 of the cover 3.

In assembly of cover 3 to base member 4, hinge pin 22 of the cover 3 is seated into portions 10, 11 of base member (see FIGS. 2 and 3) and pressed downwardly in a way that a snap-fit mounting is obtained.

After insertion, the cover may be pivoted downwardly in the direction of arrow "C" (FIG. 4) and a friction device formed by a lateral projection 26 of base member 2 in the closed position of cover 3, makes contact with a forward portion of side flange 23 of cover 3. In this completely downwardly pivoted position, the friction device provides for an increased mechanical tilt resistance holding the cover 3 on base member 2 even without an inserted IC card. When an IC card 4 is inserted into cover 3 and cover 3 is pivoted in the direction of arrow "C" (shown in FIG. 4), the forward-most lateral edge portion of IC card 4 makes contact with the wedge-type shaped locking elements 18, 19. The IC card is urged by means of the wedge-type shaped locking elements 18, 19, against the elastic force applied to the IC card by rear arm 25, in a direction perpendicular and the axis of rotation. To reach the final closed position of cover 3, flexible rear arm 25 biases IC card 4 in a direction toward raised areas 7, 8. As a result, a snap-in locking mechanism is provided by projections 18, 19 in cooperation with said forward lateral edges of the IC card 4.

If IC card 4 is inserted erroneously, such as upside-down or backward, and cover 3 is pivoted in the direction of arrow "C" shown in FIG. 4, raised area 7 is makes contact with a lateral forward edge of IC card 4 and blocks further closing movement of cover 3 and IC card 4. Consequently, the triangular cross sectional shape of raised area 7 also functions as polarizing means.

During the before-mentioned sliding movement of IC card 4 held in cover 3 relative to base member 2, contact array 5 is displaced relative to the plurality of contacts 16, 17 causing a sliding and wiping motion of contacts of array 5 relative to the plurality of contacts 16, 17.

In this closed position of rear arm 25 of cover 3, a slider 27 (see FIGS. 1 and 3), which is slidably held on hinge pin 22, can be moved from its first, unlocked position at the right side of hinge pin 22, to a second, locked position at the left side of hinge pin 22. In the second, locked position, slider 27 inhibits movement of arm 25 in a direction toward the axis of rotation, i.e. in the direction of the sliding movement of IC card 4.

In the second position of slider 27, a lateral projection 28 of arm 25 extends into a recess 29 of slider 27 latching slider 27 and locking arm 25 in the closed position of connector 1. In this double-locked position, IC card 4 can not be moved out of engagement with projections 18, 19 as IC card 4 abuts rear arm 25 and rear arm 25 abuts slider 27 in a direction toward the axis of rotation. As a consequence, external vibrational forces are unable to open connector I in its double-locked position.

To remove IC card 4 from connector 1, slider 27 is moved from its locked position shown in FIG. 1 to its unlocked position shown in FIG. 3. Then, IC card 4 is slidably moved against elastic forces applied by rear arm 25 in a direction toward the axis of rotation and projections 18, 19 move out of engagement with the forward edge of IC card 4. In this position, elastic forces applied by the plurality of contacts 16, 17 of base member 2 to contact array 5 of IC card 2 tend to further pivot IC card 4 and cover 3 in a direction opposite arrow "C" of FIG. 4. Further pivotal movement of cover 3 in the latter direction allows for gripping of the IC card 4 and removing the card from cover 3.

In handling, especially removing or inserting the card, an operator simply grasps the IC card 4 by its edges to preclude the possibility of touching the terminal array 5 of the IC card 4.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. An IC card connector (1) for connecting an IC card having a terminal array (5), comprising:

a base member (2) including a plurality of electrically conductive contacts (16, 17) exposed at least on one side of the base member (2) for engaging the terminal array (5) of the IC card (4); and a cover (3) mounted on the base member (2) for pivotal movement toward and away from said one side thereof, the cover (3) having receptacle means (23, 24) for securing the IC card (4) thereon whereby closing of the cover (3) onto the base member (2) effects engagement of the IC card terminal array (5) with the contacts (16, 17, 20) on the base member (2)

characterized in that said receptacle means (23, 24) are adapted to hold the IC card (4) for a pivotal movement therewith and for a sliding movement of the IC card (4) relative to the cover (3) in a direction perpendicular to the axis of rotation so as to lock and unlock the IC card (4) together with said cover (3) when the cover is closed onto the base member.

2. The IC card connector of claim 1 further comprising locking elements formed at the base member (2) and extending over a forward edge of the IC card (4) in the closed position of the connector (1).

3. The IC card connector of claim 2 wherein said locking elements comprise projections (18, 19) extending from the base member (2) in a direction generally perpendicular to the axis of rotation of the cover (3).

4. The IC card connector of claim 2 wherein said locking elements are wedge-type providing a snap-in locking mechanism in cooperation with said forward edge of the IC card (4).

5. The IC card connector of claim 1 further comprising means for applying an elastic force to the IC card (4) generally in the direction of said sliding movement of the IC card (4).

6. The IC card connector of claim 5 wherein said means for applying an elastic force comprises an arm (25) formed at the cover (3), which arm (25) extends generally parallel to the axis of rotation and abuts the rear edge of the IC card (4) if the IC card is fully inserted into the cover (3).

7. The IC card connector of claim 1 further comprising a friction device (26) providing an increased mechanical tilt resistance in the closed position of the cover to hold the cover (3) in the closed position.

8. The IC card connector according to claim 7 wherein said friction device (26) comprises a lateral projection (26) formed at the base member (2) and engaging a lateral flange portion (23) of the cover (3) in the closed position.

9. The IC card connector of claim 1 wherein said base member (2) forms polarizing means (7) which inhibits closing of the cover (3) if the IC card (4) is inserted erroneously in the cover (3).

10. The IC card connector of claims 1 wherein said receptacle means (23, 24) of the cover (3) comprises recesses formed by lateral flanges (23, 24) extending generally perpendicular to the axis of rotation and adapted to accommodate said IC card (4) on an inside surface of the cover (3) facing the base member (2).

11. The IC card connector of claim 1 further comprising mounting pegs (14, 15) formed at the bottom side of the base member (2).

12. The IC card connector of claim 1 further comprising snap-in hinge means (10, 11, 22) for pivotally mounting said cover (3) relative to said base member (2).

13. The IC card connector of claim 12 wherein said snap-in hinge means comprise a hinge pin (22) formed at the cover (3) and upwardly projecting portions (10, 11) having hook portions (12, 13) defined by said base member (2) for receiving said hinge pin.

14. The IC card connector of claim 6 comprising further locking means adapted to inhibit sliding movement of the IC card when the cover is closed onto the base member.

15. The IC card connector of claim 14 wherein said further locking means comprise a slider (27) held at said hinge pin (22) of the cover (3), said slider (27) being adapted to be moved between a first unlocked position and a second locked position, inhibiting movement of the arm (25) in said second locked position.

16. The IC card connector of claim 1 wherein said base member (2) is generally planar and a substantial portion of said cover (3) is relatively thin.

17. The IC card connector of claim 1 wherein said cover (3) and said base member (2) are fabricated of unitarily molded plastic material.

* * * * *